United States Patent
Kanazawa et al.

(10) Patent No.: US 10,931,215 B2
(45) Date of Patent: Feb. 23, 2021

(54) MOTOR CONTROL APPARATUS AND MOTOR CONTROL METHOD

(71) Applicant: SINFONIA TECHNOLOGY CO., LTD., Tokyo (JP)

(72) Inventors: Kazunari Kanazawa, Tokyo (JP); Takeshi Tomizaki, Tokyo (JP); Nobumasa Usiro, Tokyo (JP); Makoto Maruyama, Tokyo (JP); Yuji Ogawa, Tokyo (JP)

(73) Assignee: Sinfonia Technology Co., Ltd., Tokyo (JP)

(*) Notice: Subject to any disclaimer, the term of this patent is extended or adjusted under 35 U.S.C. 154(b) by 0 days.

(21) Appl. No.: 16/607,449

(22) PCT Filed: Oct. 30, 2017

(86) PCT No.: PCT/JP2017/039139
§ 371 (c)(1),
(2) Date: Oct. 23, 2019

(87) PCT Pub. No.: WO2018/198406
PCT Pub. Date: Nov. 1, 2018

(65) Prior Publication Data
US 2020/0144944 A1    May 7, 2020

(30) Foreign Application Priority Data
Apr. 28, 2017  (JP) ............... JP2017-089096

(51) Int. Cl.
*H02P 6/22*    (2006.01)
*H02P 6/18*    (2016.01)

(52) U.S. Cl.
CPC ............ *H02P 6/22* (2013.01); *H02P 6/186* (2013.01); *H02P 2203/01* (2013.01)

(58) Field of Classification Search
CPC .... H02P 6/00; H02P 6/22; H02P 6/186; H02P 2203/01; H02P 1/00; H02P 1/04;
(Continued)

(56) References Cited

U.S. PATENT DOCUMENTS 4,694,210 A    9/1987  Elliott et al.
7,294,988 B2 * 11/2007 Ajima ................. B60L 50/16
                                                  318/712
(Continued)

FOREIGN PATENT DOCUMENTS

JP    2011066960 A      3/2011
JP    2015100141 A  *   5/2015  ............... H02P 6/16
(Continued)

OTHER PUBLICATIONS

International Search Report (with English Translation) and Written Opinion issued in corresponding International Patent Application No. PCT/2017/039139, 11 pages (dated Jan. 16, 2018).
(Continued)

*Primary Examiner* — Antony M Paul
(74) *Attorney, Agent, or Firm* — Buchanan Ingersoll & Rooney PC

(57) ABSTRACT

A motor control apparatus 1 includes a fixed phase setting section that sets a fixed phase of a motor according to a detection signal. At the start of rotation of a rotor, the fixed phase setting section sets a first fixed phase that is equal to or greater than −90 degrees relative to a stable stopping point at a maximum electrical angle and is equal to or less than 90 degrees relative to a stable stopping point at a minimum electrical angle of the rotor as the fixed phase, and sets a second fixed phase that is equal to or greater than −90 degrees relative to a stable stopping point at a maximum
(Continued)

electrical angle and is equal to or less than 90 degrees relative to a stable stopping point at a minimum electrical angle of the rotor.

4 Claims, 9 Drawing Sheets

(58) Field of Classification Search
CPC ...... H02P 1/06; H02P 1/12; H02P 1/16; H02P 1/18; H02P 1/22; H02P 1/24; H02P 1/26; H02P 1/265; H02P 1/38; H02P 1/40; H02P 1/42; H02P 3/00; H02P 3/025; H02P 3/06; H02P 3/065; H02P 3/08; H02P 3/18; H02P 4/00; H02P 6/04; H02P 6/06; H02P 6/08; H02P 6/12; H02P 6/14; H02P 6/24; H02P 6/28; H02P 7/00; H02P 8/00; H02P 23/00; H02P 25/00; H02P 23/0027; H02P 27/00; H02P 27/04; H02P 27/06; G05B 11/28
USPC .... 318/400.01, 400.02, 400.14, 400.15, 700, 318/701, 721, 727, 799, 599, 800, 801, 318/811, 430, 432, 437
See application file for complete search history.

(56) References Cited

U.S. PATENT DOCUMENTS

| | | |
|---|---|---|
| 2009/0189552 A1 | 7/2009 | Mizumaki |
| 2011/0025243 A1 | 2/2011 | Lin |
| 2015/0069941 A1 | 3/2015 | Iwaji et al. |
| 2015/0265121 A1 | 9/2015 | Kim et al. |
| 2016/0233803 A1 | 8/2016 | Hano |
| 2016/0285398 A1 | 9/2016 | Mizuo |

FOREIGN PATENT DOCUMENTS

| | | | | |
|---|---|---|---|---|
| JP | 2015100141 A | | 5/2015 | |
| JP | 2015100142 A | * | 5/2015 | ............... H02P 6/16 |
| JP | 2015100142 A | | 5/2015 | |
| JP | 2016067081 A | | 4/2016 | |
| JP | 2016082615 A | | 5/2016 | |
| WO | 2013153657 A1 | | 10/2013 | |

OTHER PUBLICATIONS

The extended European Search Report dated Feb. 26, 2020, by the European Patent Office in corresponding European Application No. 17907254.1. (10 pages).

The extended European Search Report dated Feb. 26, 2020, by the European Patent Office in corresponding European Application No. 17907800.1. (11 pages).

International Search Report (PCT/ISA/210) dated Jan. 30, 2018, by the Japan Patent Office as the International Searching Authority for International Application No. PCT/JP2017/039138.

Written Opinion (PCT/ISA/237) dated Jan. 30, 2018, by the Japan Patent Office as the International Searching Authority for International Application No. PCT/JP2017/039138.

Notification Concerning Transmittal of Copy of International Preliminary Report on Patentability (Chapter 1 of the Patent Cooperation Treaty) (Forms PCT/IB/326, PCT/IB/373 and PCT/ISA/237) dated Nov. 7, 2019, by the International Bureau of WIPO, in corresponding International Application No. PCT/JP2017/039138. (3 pages).

Notification of Transmittal of Copies of Translation of the International Preliminary Report on Patentability (Chapter 1 or Chapter 2) (Forms PCT/IB/338, PCT/IB/373 and PCT/ISA/237) dated Nov. 7, 2019, by the International Bureau of WIPO, in corresponding International Application No. PCT/JP2017/039138. (6 pages).

The Examiners attention is directed to co-pending U.S. Appl. No. 16/607,529, filed Oct. 23, 2019.

Office Action (Rejection) dated Oct. 5, 2020, by the U.S. Patent and Trademark Office in corresponding U.S. Appl. No. 16/607,529. (22 pages).

Official Action issued in corresponding European Patent Application No. 17907254.1, dated Dec. 8, 2620 (4 pages)

\* cited by examiner

MOTOR CONTROL APPARATUS AND MOTOR CONTROL METHOD

TECHNICAL FIELD

The present invention relates to a motor control apparatus and a motor control method which, at the start of rotation of a motor, control driving of the motor using a detection signal that is outputted at every 180 degrees in terms of electrical angle in accordance with rotation of a rotor.

BACKGROUND ART

A motor control apparatus is known that, at the start of rotation of a motor, controls driving of the motor using a detection signal that is outputted at every 180 degrees in terms of electrical angle in accordance with rotation of a rotor. As such kind of motor control apparatus, for example, in Patent Literature 1, an estimated phase detection device is disclosed that estimates the phase of a rotor based on a position sensor signal of H or L that is outputted according to a phase-position relation in a circumferential direction with a sensor target that is attached on the rotor side, and a rotational speed of the rotor that is detected based on a time interval in which the position sensor signal is switched.

More specifically, in the estimated phase detection device disclosed in the aforementioned Patent Literature 1, in a first time period until switching of the position sensor signal is detected twice, a phase is estimated based on the sum of a reference phase that is defined in correspondence with H or L of the position sensor signal and an interpolation phase that is obtained by double integration of the starting acceleration. On the other hand, in a second time period after the first time period elapses, the estimated phase detection device estimates a phase based on the sum of the reference phase that is based on the position sensor signal that is switched, and an interpolation phase obtained by integrating rotational speeds detected prior to switching of the position sensor signal.

CITATION LIST

Patent Literature

Patent Literature 1: Japanese Patent Laid-Open No. 2015-100142

SUMMARY OF INVENTION

Technical Problem

According to the configuration disclosed in the aforementioned Patent Literature 1, in the first time period until switching of the position sensor signal is detected twice, because the rotational speed (detected speed) cannot be obtained when calculating the phase, the phase is estimated using the starting acceleration.

However, in a method that estimates a phase as described above, depending on the stopping position of the rotor, because there is a possibility that the rotor will rotate in the reverse direction when starting rotation, the responsiveness at the start of rotation of the rotor is not very high. Further, in the method that estimates a phase as described above, because the phase is estimated based on a sum of a reference phase and an interpolation phase, the arithmetic load is high.

An object of the present invention is, with respect to a motor control apparatus including a rotation position detecting section which is capable of detecting a rotation position of a rotor every 180 degrees in terms of electrical angle, to obtain a configuration with which the phase at the start of rotation of the rotor is easily obtained, and in which the responsiveness at the start of rotation of the rotor is high.

Solution to Problem

A motor control apparatus according to one embodiment of the present invention is a motor control apparatus that controls driving of a motor. The motor control apparatus includes: a rotation position detecting section that, at every 180 degrees of an electrical angle of the motor, outputs two kinds of detection signals according to a rotation position of a rotor of the motor; a fixed phase setting section that sets a fixed phase of the motor according to the detection signal; an estimated phase calculating section that calculates an estimated phase using the detection signal and the fixed phase; and a motor drive control section that controls rotation of the rotor based on the fixed phase or the estimated phase. At the start of rotation of the rotor, in accordance with the detection signal, the fixed phase setting section sets as the fixed phase a first fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor, and upon the kind of the detection signal that is outputted from the rotation position detecting section switching due to rotation of the rotor, in accordance with the detection signal after switching, sets as the fixed phase a second fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor. The estimated phase calculating section includes: an interpolation phase calculation section that, upon the kind of the detection signal that is outputted from the rotation position detecting section switching again due to rotation of the rotor, calculates an interpolation phase using a time at which the kind of the detection signal first is switched and a time at which the kind of the detection signal is switched for a second time; and an arithmetic section that calculates the estimated phase by adding the interpolation phase to a reference phase that is determined according to the detection signal after the kind of the detection signal is switched for the second time.

A motor control method according to one embodiment of the present invention includes: a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a second fixed phase setting step of controlling driving of the motor by means of a motor drive control section using the first fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor; an interpolation phase calculation step of controlling driving of the motor by means of the motor drive control section using the second fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and an estimated phase calculating step of calculating an estimated phase by adding the interpolation phase to a reference phase that is determined according to the detection signal after the kind of the detection signal is switched for the second time.

A motor control method according to one embodiment of the present invention includes: a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a third fixed phase setting step of controlling driving of the motor by means of a motor drive control section using the first fixed phase, and upon a predetermined time period elapsing from a time that the first fixed phase is set, and before the kind of the detection signal that is outputted from the rotation position detecting section is switched due to rotation of the rotor, setting as a third fixed phase an electrical angle that is greater than 0 degrees and is equal to or less than 90 degrees relative to the first fixed phase; a second fixed phase setting step of controlling driving of the motor by means of the motor drive control section using the third fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor; a fourth fixed phase setting step of controlling driving of the motor by means of a motor drive control section using the second fixed phase, and upon a predetermined time period elapsing from a time that the second fixed phase is set, and before the kind of the detection signal that is outputted from the rotation position detecting section is switched due to rotation of the rotor, setting as a fourth fixed phase an electrical angle that is greater than 0 degrees and is equal to or less than 90 degrees relative to the second fixed phase; an interpolation phase calculation step of controlling driving of the motor by means of the motor drive control section using the fourth fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and an estimated phase calculating step of calculating an estimated phase by adding the interpolation phase to a reference phase that is determined according to the detection signal after the kind of the detection signal is switched for the second time.

Advantageous Effects of Invention

According to a motor control apparatus according to one embodiment of the present invention, at the start of rotation of a rotor, in accordance with a detection signal that is outputted from a rotation position detecting section, a fixed phase setting section sets, as a fixed phase, a first fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor, and upon the kind of the detection signal that is outputted from the rotation position detecting section switching due to rotation of the rotor, in accordance with the detection signal after switching, sets as the fixed phase a second fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor.

Thereby, startup control of a motor can be easily performed using a fixed phase, and an error between the fixed phase and the actual phase can be made equal to or less than 90 degrees in terms of the absolute value of the electrical angle. Hence, the motor can be quickly started with good responsiveness and without the rotor of the motor rotating in the reverse direction. Accordingly, a configuration in which the phase at the start of rotation of a rotor is easily obtained and the responsiveness at the start of rotation of the rotor is high can be realized.

DESCRIPTION OF EMBODIMENTS

Figure 1:
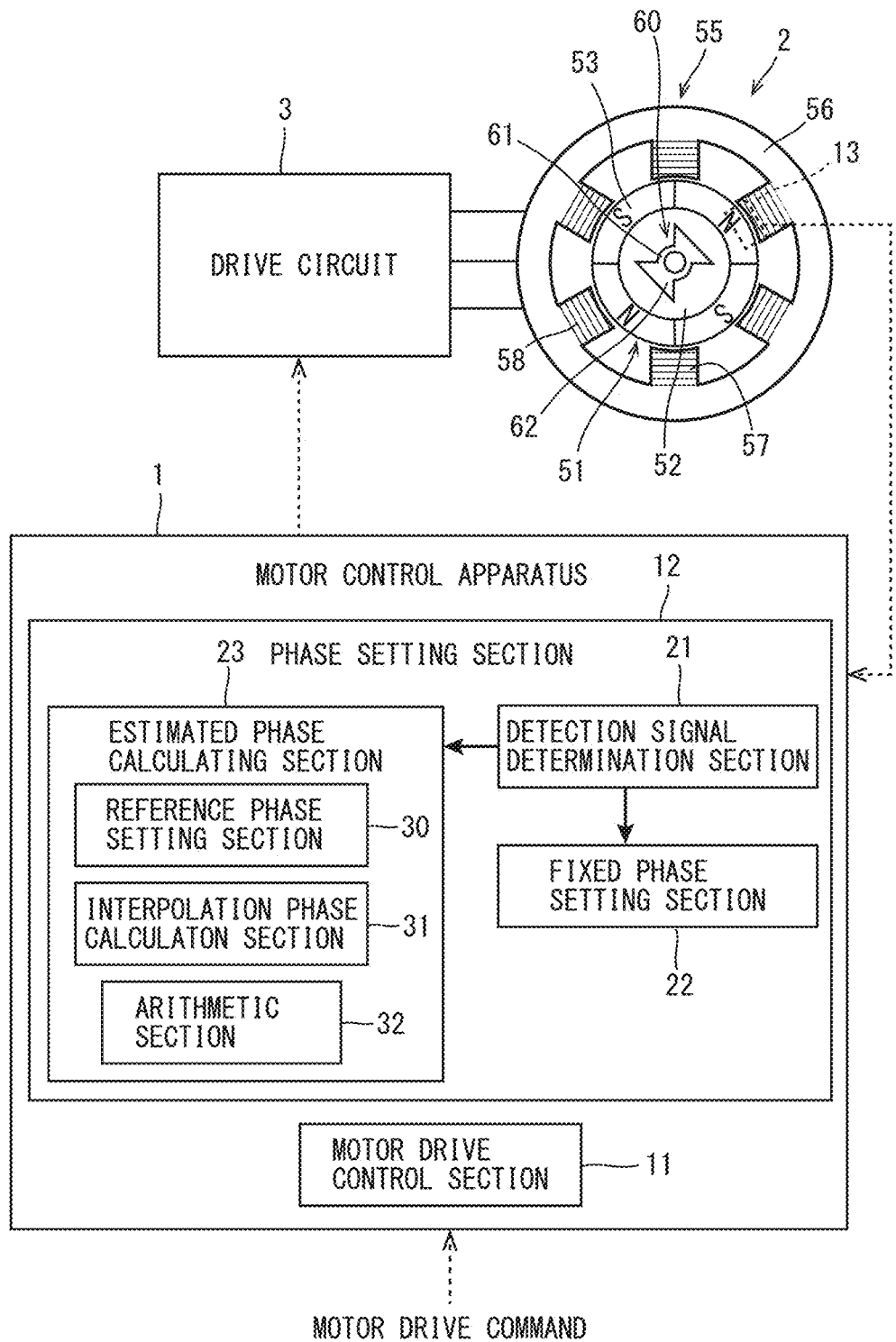
FIG. 1 is a control block diagram illustrating a schematic configuration of a motor control apparatus according to Embodiment 1.

A motor control apparatus according to one embodiment of the present invention is a motor control apparatus that controls driving of a motor. The motor control apparatus includes: a rotation position detecting section that, at every 180 degrees of an electrical angle of the motor, outputs two kinds of detection signals according to a rotation position of a rotor of the motor; a fixed phase setting section that sets a fixed phase of the motor according to the detection signal; an estimated phase calculating section that calculates an estimated phase using the detection signal and the fixed phase; and a motor drive control section that controls rotation of the rotor based on the fixed phase or the estimated phase. At the start of rotation of the rotor, in accordance with the detection signal, the fixed phase setting section sets as the fixed phase a first fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor, and upon the kind of the detection signal that is outputted from the rotation position detecting section switching due to rotation of the rotor, in accordance with the detection signal after switching, the fixed phase setting section sets as the fixed phase a second fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor. The estimated phase calculating section includes: an interpolation phase calculation section that, upon the kind of the detection signal that is outputted from the rotation position detecting section switching again due to rotation of the rotor, calculates an interpolation phase using a time at which the kind of the detection signal first is switched and a time at which the kind of the detection signal is switched for a second time; and an arithmetic section that calculates the estimated phase by adding the interpolation phase to a reference phase that is determined according to the detection signal after the kind of the detection signal is switched for the second time (first configuration).

According to the above configuration, at the start of rotation of the rotor, because a fixed phase is used for drive control of the motor, it is not necessary to calculate a phase using the starting acceleration as in the conventional configuration. Hence, the phase at the start of rotation of the rotor is easily obtained.

Furthermore, according to the above described configuration, because the starting acceleration prior to a time at which the phase is estimated as in the conventional configuration is not used, the responsiveness when starting the motor can be improved.

Figure 3:
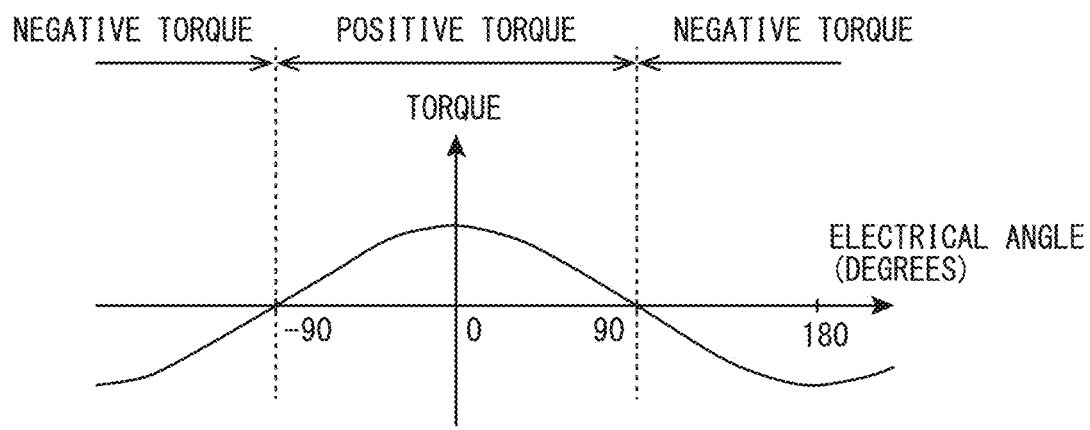
FIG. 3 is a view that schematically illustrates the relation between an error between a fixed phase and an actual phase, and torque generated at a rotor.

In this connection, in a case where an error between a fixed phase and an actual phase of a motor (hereunder, referred to as "actual phase") is greater than 90 degrees in terms of the absolute value of the electrical angle, a negative torque is generated at the rotor, as illustrated in FIG. 3. This means that, when performing drive control of the motor, if the phase of current that is applied to a stator coil deviates by greater than 90 degrees in terms of the absolute value of the electrical angle relative to the actual phase, the torque which a magnet of the rotor receives (hereunder, referred to as "magnet torque") is in the reverse direction. On the other hand, if the error between the fixed phase and the actual phase is equal to or less than 90 degrees in terms of the absolute value of the electrical angle, the magnet torque is not in the reverse direction.

Contrary to this, in the above described configuration, when rotation of the rotor starts, in accordance with a detection signal that is outputted from the rotation position detecting section, a first fixed phase which is equal to or greater than −90 degrees in terms of electrical angle relative to a stable stopping point at a maximum electrical angle and is equal to or less than 90 degrees in terms of electrical angle relative to a stable stopping point at a minimum electrical angle among the stable stopping points of the rotor is adopted as the fixed phase. Thereby, an error in the aforementioned fixed phase can be made equal to or less than 90 degrees in terms of the absolute value of the electrical angle relative to the phase at a rotation position of the rotor that stops at a stable stopping point.

In addition, upon the kind of the detection signal that is outputted from the rotation position detecting section switching due to rotation of the rotor, a second fixed phase is adopted as the fixed phase. The second fixed phase is, for example, 270 degrees in terms of electrical angle in a case where the first fixed phase is 90 degrees in terms of electrical angle, and is 90 degrees in terms of electrical angle in a case where the first fixed phase is 270 degrees in terms of electrical angle. Thereby, an error in the fixed phase with respect to the actual phase can be made equal to or less than 90 degrees in terms of the absolute value of the electrical angle.

Therefore, according to the above described configuration, rotation of the rotor in the reverse direction can be prevented even in a case where startup control of the motor is performed using the fixed phase. Accordingly, it is possible to quickly start the motor.

In the aforementioned first configuration, upon a predetermined time period elapsing from a time when the first fixed phase or the second fixed phase is set as the fixed phase, and before the kind of the detection signal that is outputted from the rotation position detecting section is switched due to rotation of the rotor, the fixed phase setting section sets as the fixed phase an auxiliary fixed phase that, relative to the fixed phase that is set, is greater than 0 degrees and is equal to or less than 90 degrees in terms of electrical angle (second configuration).

Thereby, an error between the fixed phase and the actual phase can be more reliably made equal to or less than 90 degrees in terms of the absolute value of the electrical angle.

In addition, because the aforementioned error is reduced compared to a case where the fixed phase is set to 90 degrees or 270 degrees in terms of electrical angle, a larger magnet torque is obtained. Hence, the motor can be started more quickly.

A motor control method according to one embodiment of the present invention includes: a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a second fixed phase setting step of controlling driving of the motor by means of a motor drive control section using the first fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor; an interpolation phase calculation step of controlling driving of the motor by means of the motor drive control section using the second fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and an estimated phase calculating step of calculating an estimated phase by adding the interpolation phase to a reference phase that is determined according to the detection signal after the kind of the detection signal is switched for the second time (first method).

A motor control method according to one embodiment of the present invention includes: a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a third fixed phase setting step of controlling driving of the motor by means of a motor drive control section using the first fixed phase, and upon a predetermined time period elapsing from a time that the first fixed phase is set, and before the kind of the detection signal that is outputted from the rotation position detecting section is switched due to rotation of the rotor, setting as a third fixed phase an electrical angle that is greater than 0 degrees and is equal to or less than 90 degrees relative to the first fixed phase; a second fixed phase setting step of controlling driving of the motor by means of the motor drive control section using the third fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor; a fourth fixed phase setting step of controlling driving of the motor by means of a motor drive control section using the second fixed phase, and upon a predetermined time period elapsing from a time that the second fixed phase is set, and before the kind of the detection signal that is outputted from the rotation position detecting section is switched due to rotation of the rotor, setting as a fourth fixed phase an electrical angle that is greater than 0 degrees and is equal to or less than 90 degrees relative to the second fixed phase; an interpolation phase calculation step of controlling driving of the motor by means of the motor drive control section using the fourth fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and an estimated phase calculating step of calculating an estimated phase by adding the interpolation phase to a reference phase that is determined according to the detection signal after the kind of the detection signal is switched for the second time (second method).

Hereunder, embodiments of the present invention are described in detail with reference to the accompanying drawings. The same or equivalent parts in the drawings are denoted by the same reference numerals and a description of such parts is not repeated.

Embodiment 1

FIG. 1 is a block diagram illustrating the schematic configuration of a motor control apparatus 1 according to Embodiment 1 of the present invention. The motor control apparatus 1 outputs a control signal to a drive circuit 3 that causes a motor 2 to drive. That is, the motor control apparatus 1 controls driving of the motor 2. The motor 2 includes a rotor 51, a stator 55 and a detection target 60. In FIG. 1, reference numeral 13 denotes a position detecting sensor, described later, that detects a rotation position of the detection target 60.

The motor 2 is, for example, a so-called "inner-rotor type motor" in which the rotor 51 is disposed inside the stator 55 which has a cylindrical shape. Note that, the motor may be a so-called "outer-rotor type motor" in which the rotor rotates on the outward side in the radial direction of the stator.

The rotor 51 includes a rotor core 52, and field magnets 53 that are arranged side-by-side in the circumferential direction at an outer circumferential portion of the rotor core 52. In the present embodiment, four of the field magnets 53 are arranged at the outer circumferential portion of the rotor core 52. That is, the number of poles of the motor 2 of the present embodiment is four. Note that the field magnets 53 may be disposed inside the rotor core.

The stator 55 includes a substantially cylindrical yoke 56, a plurality of (in the present embodiment, six) teeth 57 that extend in the inward direction from the inner circumferential face of the yoke 56, and coils 58 that are wound around the teeth 57. The yoke 56 and the plurality of teeth 57 are integrally formed.

The motor 2 of the present embodiment is, for example, a motor in which the number of poles is four and the number of slots is six. Note that, the number of poles of the motor 2 may be other than four, and the number of slots may be other than six.

The detection target 60 rotates integrally with the rotor 51. The detection target 60 is made of magnetic material. The detection target 60 includes a main body portion 61, and a pair of protruding portions 62 that protrude from the main body portion 61 toward one direction and the other direction, respectively, in the radial direction of the motor 2. That is, the pair of protruding portions 62 are provided at an interval of 180 degrees on the outer circumferential side of the main body portion 61. Thus, the detection target 60 has concavities and convexities in the outer circumferential surface thereof.

The drive circuit 3 is a switching circuit having a plurality of switching elements (not illustrated in the drawing) that constitute a three-phase bridge circuit, so as to cause the motor 2 to drive. The drive circuit 3 has the same configuration as a common switching circuit, and hence a detailed description will be omitted here.

The motor control apparatus 1 outputs a control signal for driving the switching elements to the drive circuit 3 in accordance with a motor drive command that is inputted thereto. Further, in accordance with the motor drive command, the motor control apparatus 1 controls driving of the motor 2 by performing phase control based on the rotation position of the rotor 51 of the motor 2. Note that, the motor drive command is inputted into the motor control apparatus 1 from an unshown higher order controller.

Specifically, the motor control apparatus 1 includes a motor drive control section 11, a phase setting section 12 and a rotation position detecting section 13. The motor drive control section 11 generates a control signal for causing the motor 2 to drive, in accordance with a phase that is set by the phase setting section 12. The motor drive control section 11 outputs the control signal that is generated to the drive circuit 3. Note that, the configuration of the motor drive control section 11 is the same as the conventional configuration, and hence a detailed description thereof will be omitted here.

The rotation position detecting section 13 has a magnet that generates magnetic flux between the rotor 51 and the detection target 60 that rotates integrally with the rotor 51. When the detection target 60 which has concavities and convexities in the outer circumferential surface thereof rotates integrally with the rotor 51, the rotation position detecting section 13 detects changes in the magnetic flux between the detection target 60 and the rotation position detecting section 13, and outputs detection signals of two kinds (a High signal and a Low signal). When the rotation position detecting section 13 detects a change in the magnetic flux between the detection target 60 and the rotation position detecting section 13, the rotation position detecting section 13 is switched the kind of the detection signal.

Specifically, in a case where either one of the pair of protruding portions 62 of the detection target 60 is positioned on the inner side in the radial direction, the rotation position detecting section 13 outputs the High signal as the detection signal, while in a case where a part other than the pair of protruding portions 62 of the detection target 60 is positioned on the inner side in the radial direction, the rotation position detecting section 13 outputs the Low signal as the detection signal. The detection signal that is outputted from the rotation position detecting section 13 is inputted to the phase setting section 12 in the motor control apparatus 1. Note that, when starting the motor 2 also, the rotation position detecting section 13 outputs one detection signal among the two kinds of detection signals (High signal and Low signal) in accordance with the rotation position of the detection target 60.

The phase setting section 12 sets a phase to be used by the motor drive control section 11 in accordance with the detection signal that is outputted from the rotation position detecting section 13. When starting the motor 2, that is, at the start of rotation of the rotor 51, the phase setting section 12 sets a first fixed phase in accordance with the detection signal that is outputted from the rotation position detecting section 13. Further, after setting the first fixed phase, upon the kind of the detection signal that is outputted from the rotation position detecting section 13 switching due to rotation of the rotor 51, the phase setting section 12 sets a second fixed phase. The first fixed phase and the second fixed phase are used for controlling driving of the motor 2 in the period in which the first fixed phase and the second fixed phase are set by the phase setting section 12. In addition, upon the detection signal that is outputted from the rotation position detecting section 13 switching again, the phase setting section 12 calculates an estimated phase. The estimated phase is used for drive control of the motor 2 until a new phase is set by the phase setting section 12.

Specifically, the phase setting section 12 includes a detection signal determination section 21, a fixed phase setting section 22 and an estimated phase calculating section 23.

When the detection signal that is outputted from the rotation position detecting section 13 is switched between the Low signal and the High signal, the detection signal determination section 21 detects switching (hereunder, referred to as an "edge") of the signal. Further, the detection signal determination section 21 counts the edges of the detection signals outputted from the rotation position detecting section 13, and in a case where an edge reaches a predetermined number of times (two times in the present embodiment), the detection signal determination section 21 outputs a calculation instruction signal. As will be described later, the estimated phase calculating section 23 calculates an estimated phase in response to the calculation instruction signal.

During a period from the time of starting of the motor 2 until the aforementioned calculation instruction signal is outputted by the detection signal determination section 21, the fixed phase setting section 22 sets the first fixed phase or second fixed phase in accordance with the detection signal that is outputted from the rotation position detecting section 13.

Specifically, at startup of the motor 2, in a case where the detection signal that is outputted from the rotation position detecting section 13 is the Low signal, the fixed phase setting section 22 sets 90 degrees in terms of electrical angle as the first fixed phase. On the other hand, at startup of the motor 2, in a case where the detection signal that is outputted from the rotation position detecting section 13 is the High signal, the fixed phase setting section 22 sets 270 degrees in terms of electrical angle as the first fixed phase. The first fixed phase is used for drive control of the motor 2.

Further, after the first fixed phase has been set, in a case where a first edge of the detection signal that is outputted from the rotation position detecting section 13 is detected by the detection signal determination section 21, the fixed phase setting section 22 sets 270 degrees in terms of electrical angle as the second fixed phase in a case where the first fixed phase is 90 degrees in terms of electrical angle, and sets 90 degrees in terms of electrical angle as the second fixed phase in a case where the first fixed phase is 270 degrees in terms of electrical angle. The second fixed phase is used for drive control of the motor 2.

Figure 2:
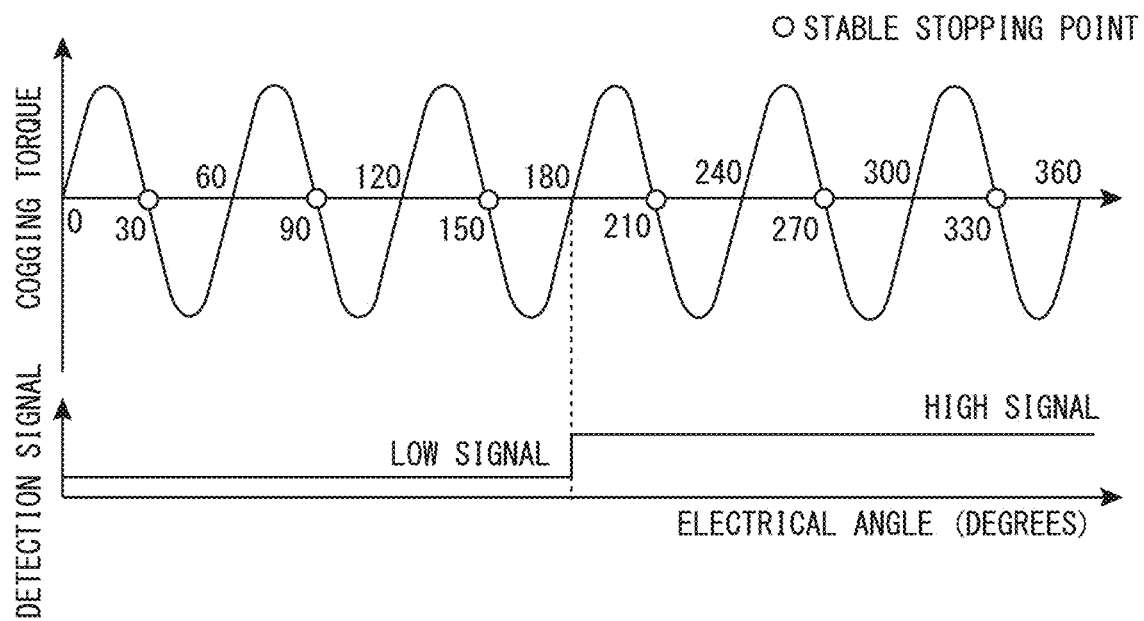
FIG. 2 is a view that schematically illustrates the relation between an electrical angle, and cogging torque and a detection signal.

In this case, the rotation position at which the rotor 51 of the motor 2 stops is determined by the influence of cogging torque that is generated in the motor 2. That is, the rotor 51 stops at the position (stable stopping point) of an electrical angle at which the cogging torque is zero and a gradient of the cogging torque with respect to the electrical angle is negative. The relation between cogging torque that is generated in the motor 2 and stable stopping points of the rotor 51 is illustrated in FIG. 2. As illustrated in FIG. 2, within a range in which the electrical angle is from 0 degrees to 180 degrees, the stable stopping points are 30 degrees (stable stopping point at minimum electrical angle), 90 degrees and 150 degrees (stable stopping point at maximum electrical angle), and within a range in which the electrical angle is from 180 degrees to 360 degrees, the stable stopping points are 210 degrees (stable stopping point at minimum electrical angle), 270 degrees and 330 degrees (stable stopping point at maximum electrical angle).

Note that, in FIG. 2, the position at which the detection signal that is outputted from the rotation position detecting section 13 is switched from the High signal to the Low signal is at an electrical angle of 0 degrees. Hence, in FIG. 2, the position at which the detection signal that is outputted from the rotation position detecting section 13 is switched from the Low signal to the High signal is 180 degrees in terms of electrical angle.

In this connection, in a case where there is an error between the phase that is used for drive control of the motor 2 and the actual phase of the motor 2, the torque that is generated at the rotor 51 also changes according to the error. The relation between the aforementioned error and the torque that is generated at the rotor 51 is illustrated in FIG. 3. Note that, in FIG. 3, a positive value of the magnet torque (hereunder, also referred to as simply "torque") represents torque that causes the rotor 51 to rotate in the rotational direction indicated in the motor drive command (hereunder, referred to as "forward rotation") when causing the motor 2 to drive. On the other hand, in FIG. 3, a negative value of the torque represents torque that causes the rotor 51 to rotate in the reverse direction to the rotational direction indicated in the motor drive command (hereunder, referred to as "reverse rotation"). Further, in the following description, an error in a phase is a value obtained by subtracting the phase that is used for drive control of the motor 2 from the actual phase.

As illustrated in FIG. 3, within a range in which the aforementioned error is greater than −90 degrees and is less than 90 degrees in terms of electrical angle, a positive torque, that is, a torque that causes the rotor 51 to perform forward rotation is generated at the rotor 51. On the other hand, within a range in which the aforementioned error is greater than 90 degrees and is less than −90 degrees in terms of electrical angle, a negative torque, that is, a torque that causes the rotor 51 to perform reverse rotation is generated at the rotor 51.

Accordingly, if an error between the phase used for drive control of the motor 2 and the actual phase of the motor 2 is less than 90 degrees in terms of the absolute value of the electrical angle, the rotor 51 can be caused to perform forward rotation, and therefore the motor 2 can be quickly started.

FIG. 2 illustrates the relation between the detection signal that is outputted from the rotation position detecting section 13 and the electrical angle. As illustrated in FIG. 2, in a case where the detection signal is the Low signal, the electrical angle is between 0 degrees and 180 degrees, and in a case where the detection signal is the High signal, the electrical angle is between 180 degrees and 360 degrees.

Hence, in a case where the detection signal is the Low signal, although it is not known which stopping position among 30 degrees, 90 degrees and 150 degrees in terms of electrical angle the rotor 51 stops at, as mentioned previously, by setting the first fixed phase to 90 degrees in terms of electrical angle, an error between the actual phase at the stopping position of the rotor 51 and the first fixed phase can be made equal to or less than 90 degrees in terms of the absolute value of the electrical angle.

Similarly, in a case where the detection signal is the High signal, although it is not known which stopping position among 210 degrees, 270 degrees and 330 degrees in terms of electrical angle the rotor 51 stops at, as mentioned previously, by setting the first fixed phase to 270 degrees in terms of electrical angle, an error between the actual phase at the stopping position of the rotor 51 and the first fixed phase can be made equal to or less than 90 degrees in terms of the absolute value of the electrical angle.

As described above, by setting the first fixed phase to 90 degrees in terms of electrical angle when the detection signal is the Low signal, and setting the first fixed phase to 270 degrees in terms of electrical angle when the detection signal is the High signal, the rotor 51 can be caused to perform forward rotation when starting the motor 2. That is, at the start of rotation of the rotor 51, the fixed phase setting section 22 sets the fixed phase to 90 degrees or 270 degrees in terms of electrical angle in accordance with the detection signal. Thereby, the error between the fixed phase and the actual phase becomes equal to or less than 90 degrees in terms of the absolute value of the electrical angle. Hence, the rotor 51 of the motor 2 can be prevented from rotating in the reverse direction.

The estimated phase calculating section 23 calculates an estimated phase when the detection signal determination section 21 detects an edge a second time based on the detection signal and outputs the aforementioned calculation instruction signal. The estimated phase calculating section 23 calculates an interpolation phase using the time at which the edge of the detection signal outputted from the rotation position detecting section 13 is detected, and calculates the estimated phase by adding the interpolation phase to a reference phase that is determined based on the detection signal.

Specifically, the estimated phase calculating section 23 includes a reference phase setting section 30, an interpolation phase calculation section 31 and an arithmetic section 32. The reference phase setting section 30 sets a reference phase in accordance with the detection signal outputted from the rotation position detecting section 13. Specifically, when the detection signal is the Low signal, the reference phase setting section 30 sets 0 degrees in terms of electrical angle as the reference phase, and when the detection signal is the High signal, the reference phase setting section 30 sets 180 degrees in terms of electrical angle as the reference phase.

When the aforementioned calculation instruction signal is outputted from the detection signal determination section 21, that is, when a second edge of the detection signal is detected by the detection signal determination section 21, the interpolation phase calculation section 31 calculates an interpolation phase using a detection time t1 at which the first edge of the detection signal is detected (time at which the kind of the detection signal is switched for the first time) and a detection time t2 at which the second edge of the detection signal is detected (time at which the kind of the detection signal is switched for the second time). Specifically, the interpolation phase calculation section 31 determines the rotational speed of the motor 2 by dividing the difference (180 degrees in terms of electrical angle) between the rotation position when the first edge of the detection signal is detected and the rotation position when the second edge of the detection signal is detected, by a difference (t2−t1) between the detection time t1 and the detection time t2. The interpolation phase calculation section 31 then obtains the interpolation phase by integration of the rotational speed.

Further, after the calculation instruction signal is outputted from the detection signal determination section 21, each time that an edge of the detection signal is detected by the detection signal determination section 21, the interpolation phase calculation section 31 determines the rotational speed of the motor 2 using the relevant detection time and the immediately preceding detection time, and obtains the interpolation phase by integration of the rotational speed.

When the calculation instruction signal is outputted from the detection signal determination section 21, that is, when a second edge of the detection signal is detected by the detection signal determination section 21, the arithmetic section 32 adopts a value obtained by adding the interpolation phase to the reference phase as the estimated phase. Further, after the calculation instruction signal is outputted from the detection signal determination section 21, each time that an edge of the detection signal is detected, the arithmetic section 32 determines the estimated phase by adding an interpolation phase that is calculated by the interpolation phase calculation section 31 to a reference phase that is set by the reference phase setting section 30. The estimated phase is used for the drive control of the motor 2.

Motor Control Method

Next, a motor control method that is implemented by actuating the motor control apparatus 1 having the configuration described above will be described using a flowchart illustrated in FIG. 4.

Figure 4:
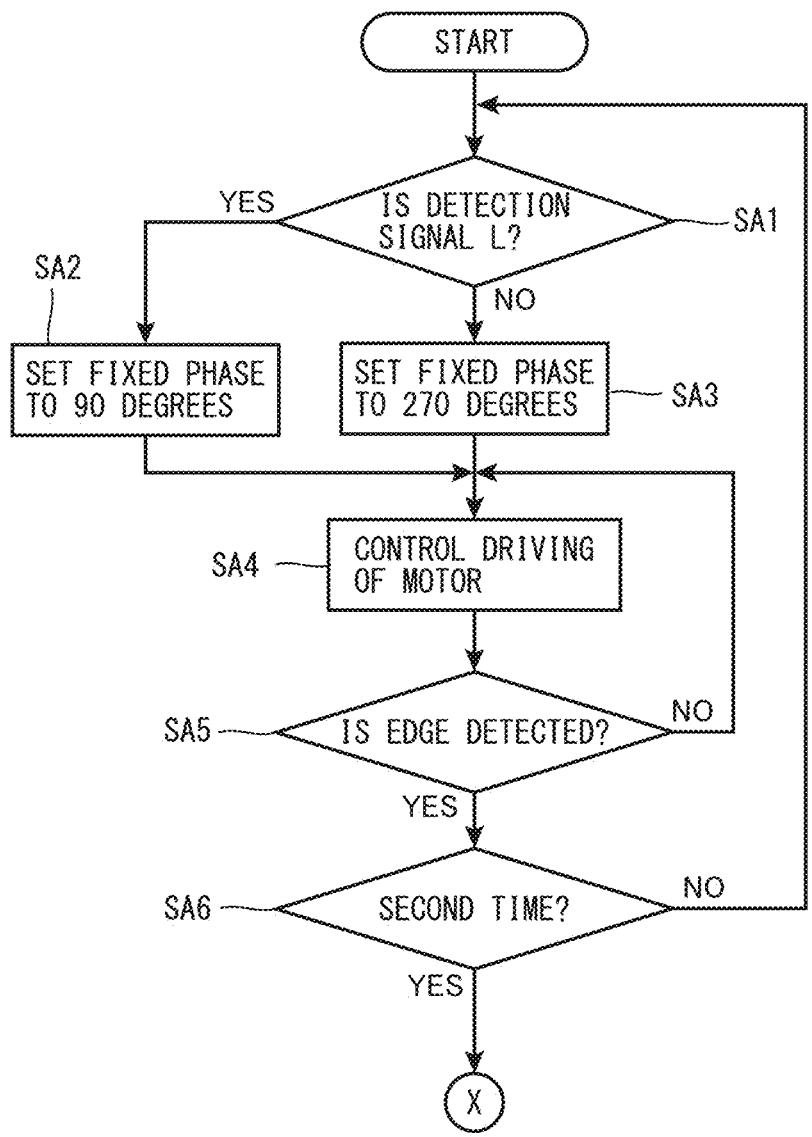
FIG. 4 is a flowchart illustrating an example of operations of a motor control apparatus.
Figure 5:
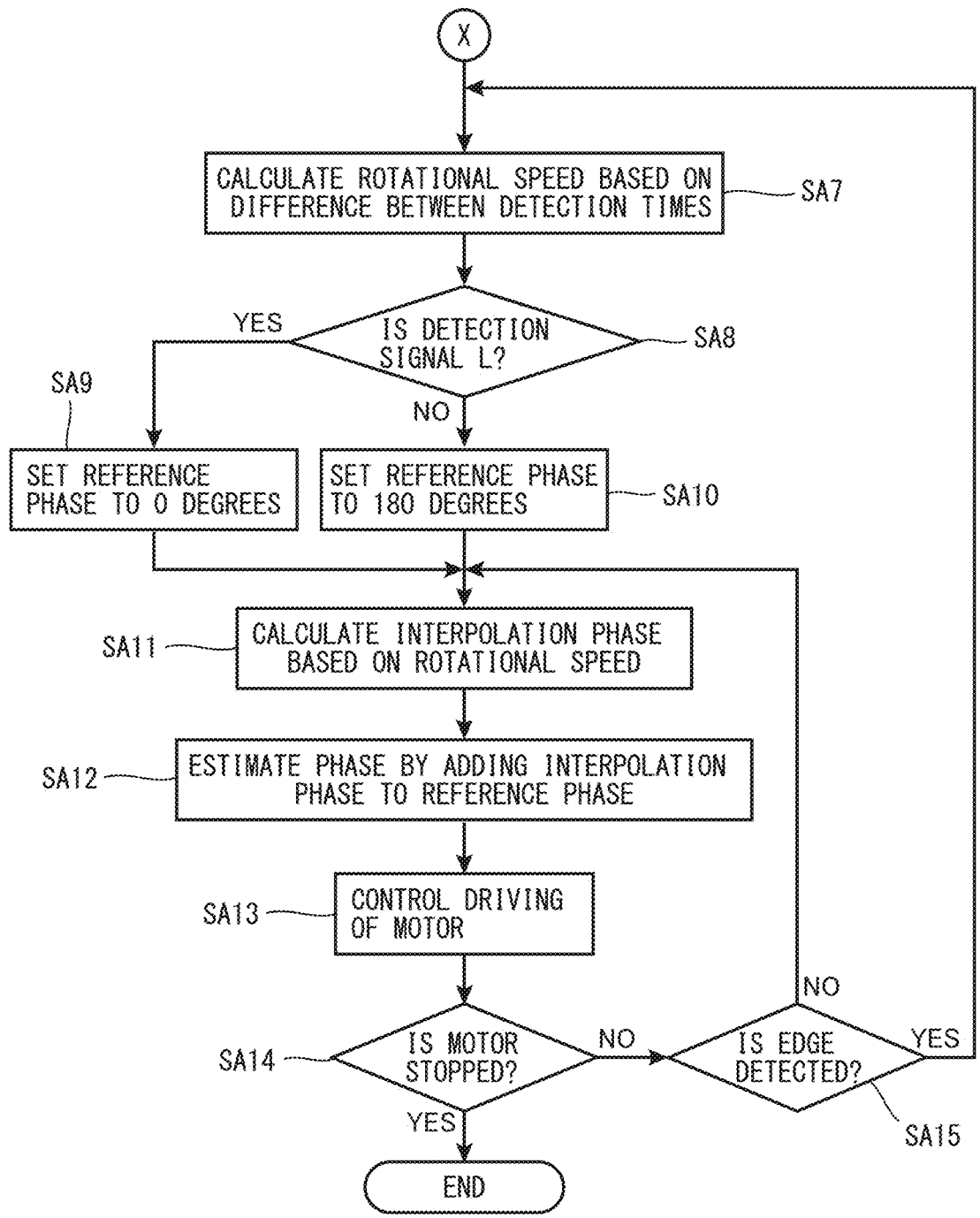
FIG. 5 is a flowchart illustrating an example of operations of a motor control apparatus.

Upon the start of the operations in the flowchart illustrated in FIG. 4, first, in step SA1, the fixed phase setting section 22 determines whether or not the detection signal that is outputted from the rotation position detecting section 13 is the Low signal ("L" in FIG. 4).

If it is determined in step SA1 that the detection signal is the Low signal (Yes in SA1), the operation proceeds to step SA2 in which the fixed phase setting section 22 sets 90 degrees in terms of electrical angle as the first fixed phase. On the other hand, if it is determined in step SA1 that the detection signal is not the Low signal (No in SA1), that is, when the detection signal is the High signal, the operation proceeds to step SA3 in which the fixed phase setting section 22 sets 270 degrees in terms of electrical angle as the first fixed phase.

After the fixed phase setting section 22 sets the first fixed phase in step SA2 or step SA3, the operation proceeds to step SA4 in which the motor drive control section 11 generates a control signal for controlling driving of the motor 2 using the first fixed phase. Thereby, the motor 2 is subjected to drive control based on the first fixed phase, and the rotor 51 starts to rotate.

Thereafter, the operation proceeds to step SA5 in which the detection signal determination section 21 determines whether or not an edge of the detection signal has been detected. If it is determined in step SA5 that an edge of the detection signal has been detected (Yes in SA5), the operation proceeds to step SA6 in which it is determined whether or not the detection of the edge of the detection signal is the second time an edge has been detected.

In contrast, if it is determined in step SA5 that an edge of the detection signal is not detected (No in SA5), the operation returns to step SA4 in which drive control of the motor 2 is continued.

If it is determined in step SA6 that the detection of the edge of the detection signal is the second time an edge has been detected (Yes in SA6), the operation proceeds to step SA7 in which the interpolation phase calculation section 31 calculates the rotational speed of the rotor 51.

In contrast, if it is determined in step SA6 that the detection of the edge of the detection signal is not the second time an edge has been detected (No in SA6), the operation returns to step SA1 in which a determination as to whether or not the detection signal is the Low signal is performed.

Note that, when the edge of the detection signal is detected in the aforementioned step SA5, the detection signal that is outputted from the rotation position detecting section 13 is switched from the High signal to the Low signal or from the Low signal to the High signal. Therefore, in a case where the detection signal is switched from the High signal to the Low signal in step SA1 (Yes in SA1) that is proceeded to when the result of the determination in step SA6 is "No", the fixed phase setting section 22 sets 90 degrees in terms of electrical angle as the second fixed phase (step SA2). On the other hand, in a case where the detection signal is switched from the Low signal to the High signal (No in SA1), the fixed phase setting section 22 sets 270 degrees in terms of electrical angle as the second fixed phase (step SA3). Thereafter, the motor drive control section 11 generates a control signal using the second fixed phase, and controls driving of the motor 2 (step SA4).

In step SA7 that the operation proceeds to when it is determined in step SA6 that it is the second time the edge of the detection signal is detected, the interpolation phase calculation section 31 calculates the rotational speed of the rotor 51 in response to the calculation instruction signal that is outputted from the detection signal determination section 21. Specifically, the interpolation phase calculation section 31 calculates the rotational speed of the rotor 51 using the detection time t1 at which the first edge of the detection signal is detected and the detection time t2 at which the second edge of the detection signal is detected. At such time, during the period from the time that the first edge of the detection signal is detected until the second edge of the detection signal is detected, the rotor 51 rotates 180 degrees in terms of electrical angle. Therefore, the interpolation phase calculation section 31 calculates the rotational speed of the rotor 51 by the calculation $\pi/(t2-t1)$ [rad/s].

Next, in step SA8, it is determined whether or not the detection signal that is outputted from the rotation position detecting section 13 is the Low signal. If it is determined in step SA8 that the detection signal is the Low signal (Yes in step SA8), the operation proceeds to step SA9 in which the reference phase setting section 30 sets an electrical angle of 0 degrees as the reference phase.

In contrast, in step SA8, if it is determined that the detection signal is not the Low signal, that is, if it is determined that the detection signal is the High signal (No in step SA8), the operation proceeds to step SA10 in which the reference phase setting section 30 sets an electrical angle of 180 degrees as the reference phase.

In step SA11 that the operation proceeds to after step SA9 or SA10, the interpolation phase calculation section 31 calculates an interpolation phase by integration of the rotational speed calculated in step SA7.

Thereafter, the operation proceeds to step SA12 in which the arithmetic section 32 determines an estimated phase by adding the interpolation phase to the aforementioned reference phase. Subsequently, in step SA13, the motor drive control section 11 generates a control signal for controlling driving of the motor 2, using the estimated phase determined in step SA12. Thereby, the motor 2 is subjected to drive control based on the estimated phase determined in step SA12.

Thereafter, in step SA14, the motor control apparatus 1 determines whether or not driving of the motor 2 stops. If it is determined in step SA14 that driving of the motor 2 stops (Yes in step SA14), the operation flow ends (end). On the other hand, if it is determined in step SA14 that driving of the motor 2 is not stopped (No in step SA14), the operation proceeds to step SA15 in which a determination as to whether or not the edge of the detection signal outputted from the rotation position detecting section 13 is detected is performed.

If it is determined in step SA15 that the edge of the detection signal is detected (Yes in SA15), the operation returns to step SA7 in which the interpolation phase calculation section 31 calculates the rotational speed based on the difference between the time of the most recent edge detection and the time of the edge detection that immediately preceded the most recent edge detection.

In contrast, in step SA15, if it is determined that the edge of the detection signal is not detected (No in SA15), the operation returns to step SA11.

Here, steps SA1 to SA3 correspond to a first fixed phase setting step. Steps SA4 to SA6 and steps SA1 to SA3 correspond to a second fixed phase setting step. Steps SA4 to SA7, and SA11 correspond to an interpolation phase calculation step. Steps SA8 to SA10, and SA12 correspond to an estimated phase calculating step.

Changes in Torque in Case Where Fixed Phase is Set

Next, changes in the torque generated at the rotor 51 in a case where the fixed phase is set by the fixed phase setting section 22 will be described. Hereunder, to simplify the description, a case is described in which the fixed phase setting section 22 sets the first fixed phase. Changes in the torque generated at the rotor 51 in a case of an electrical angle of 90 degrees that is set when the detection signal is the Low signal, and in the case of an electrical angle of 270 degrees that is set when the detection signal is the High signal are similar. Therefore, hereunder a case in which the first fixed phase is set to an electrical angle of 90 degrees will be described.

As mentioned above, when the detection signal that is outputted from the rotation position detecting section 13 is the Low signal, rotation positions at which the rotor 51 stops are 30 degrees, 90 degrees and 150 degrees in terms of electrical angle. Hence, in a case where the fixed phase is set to 90 degrees in terms of electrical angle, an error between the fixed phase and the actual phase when the motor starts is −60 degrees, 0 degrees or 60 degrees in terms of electrical angle. Hereunder, changes in the torque accompanying rotation of the rotor 51 will be described for three patterns with respect to the rotation positions at which the rotor 51 stops (30 degrees, 90 degrees and 150 degrees in terms of electrical angle), respectively.

Pattern 1

Figure 6:
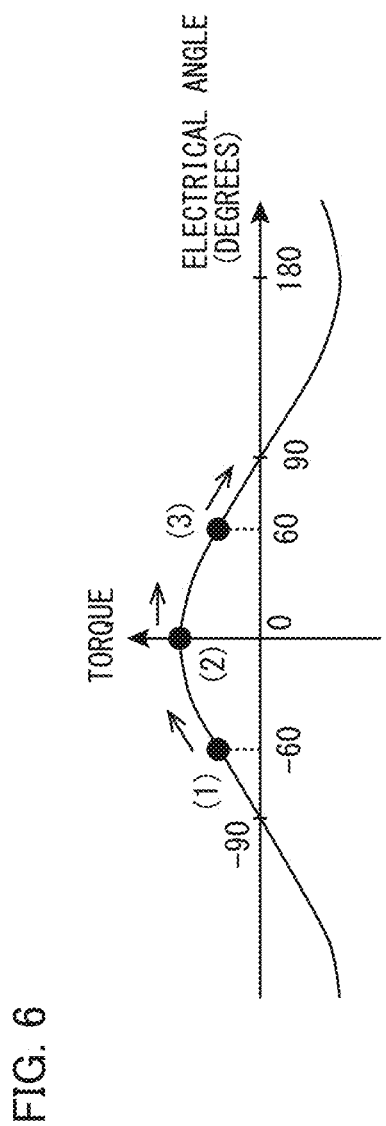
FIG. 6 is a view that schematically illustrates changes in torque generated at a rotor due to rotation of the rotor, in a case where a fixed phase is set.

A case where the rotor 51 stops at the rotation position of 30 degrees in terms of electrical angle is referred to as "pattern 1". In the case of pattern 1, an error between the fixed phase and the actual phase when the motor starts is −60 degrees. In FIG. 6 that shows changes in the torque with respect to the error, the case of pattern 1 is denoted by reference numeral (1). In the case of pattern 1, a positive torque that causes forward rotation is generated at the rotor 51.

When the rotor 51 performs forward rotation, the actual phase gradually becomes larger, and consequently the error gradually decreases as indicated by a solid-line arrow in FIG. 6. Thus, the torque generated at the rotor 51 gradually increases.

In a case where the rotor 51 performs forward rotation and the actual phase matches the fixed phase, since the error becomes zero, the torque generated at the rotor 51 becomes the maximum torque. When the rotor 51 performs further forward rotation, the actual phase becomes larger than the fixed phase, and consequently the error that has a positive value gradually increases. Thus, the torque generated at the rotor 51 gradually decreases.

When the error reaches 90 degrees in terms of electrical angle, the actual phase is 180 degrees in terms of electrical angle. At this time, because the detection signal that is outputted from the rotation position detecting section 13 is switched to the High signal, an edge of the detection signal is detected by the detection signal determination section 21. Thereby, the fixed phase is switched to 270 degrees. Because the aforementioned error is within the range of −90 degrees to 90 degrees in terms of electrical angle, the rotor 51 continues forward rotation.

Note that, when the aforementioned error is 90 degrees, although the torque that is generated at the rotor 51 is zero, because of inertial force and cogging torque of the rotor 51, the rotor 51 does not immediately stop. Further, although the error is −90 degrees at the moment at which the fixed phase is switched to 270 degrees, in this case also, because of inertial force and cogging torque the rotor 51 does not immediately stop and instead continues forward rotation.

Pattern 2

A case where the rotor 51 stops at the rotation position of 90 degrees in terms of electrical angle is referred to as "pattern 2". In the case of pattern 2, an error between the fixed phase and the actual phase when the motor starts is 0 degrees. In FIG. 6, the case of pattern 2 is denoted by reference numeral (2). In the case of pattern 2, a positive torque that causes forward rotation is generated at the rotor 51.

When the rotor 51 performs forward rotation, the actual phase gradually increases, and consequently, as indicated by a solid-line arrow in FIG. 6, the error gradually increases. Thus, the torque generated at the rotor 51 gradually decreases.

When the error reaches 90 degrees in terms of electrical angle, the actual phase is 180 degrees in terms of electrical angle, which is the same as in the case of pattern 1. Hence, a description thereof will be omitted here.

Accordingly, in the case of pattern 2 also, the rotor 51 continues forward rotation.

Pattern 3

A case where the rotor 51 stops at the rotation position of 150 degrees in terms of electrical angle is referred to as "pattern 3". In the case of pattern 3, an error between the fixed phase and the actual phase when the motor starts is 60 degrees. In FIG. 6, the case of pattern 3 is denoted by reference numeral (3). In the case of pattern 3, a positive torque that causes forward rotation is generated at the rotor 51.

When the rotor 51 performs forward rotation, the actual phase gradually increases, and consequently, as indicated by a solid-line arrow in FIG. 6, the error gradually increases. Thus, the torque generated at the rotor 51 gradually decreases.

When the error reaches 90 degrees in terms of electrical angle, the actual phase is 180 degrees in terms of electrical angle, which is the same as in the case of pattern 1. Hence, a description thereof will be omitted here.

Accordingly, in the case of pattern 3 also, the rotor 51 continues forward rotation.

As described above, by setting 90 degrees or 270 degrees in terms of electrical angle as the fixed phase in accordance with the detection signal that is outputted from the rotation position detecting section 13, the rotor 51 of the motor 2 can be caused to perform forward rotation without being caused to perform reverse rotation.

Furthermore, by using a fixed phase at startup of the motor 2, it is not necessary to perform an arithmetic operation for estimating the phase as in the conventional configuration. Hence, by using a fixed phase at startup of the motor 2, the motor 2 can be started easily and with good responsiveness in comparison to a method that performs an arithmetic operation to estimate the phase.

Therefore, according to the configuration of the present embodiment, a configuration in which the phase at the start of rotation of the rotor 51 is easily obtained and the responsiveness when rotation of the rotor 51 starts is high can be realized.

Embodiment 2

Figure 7:
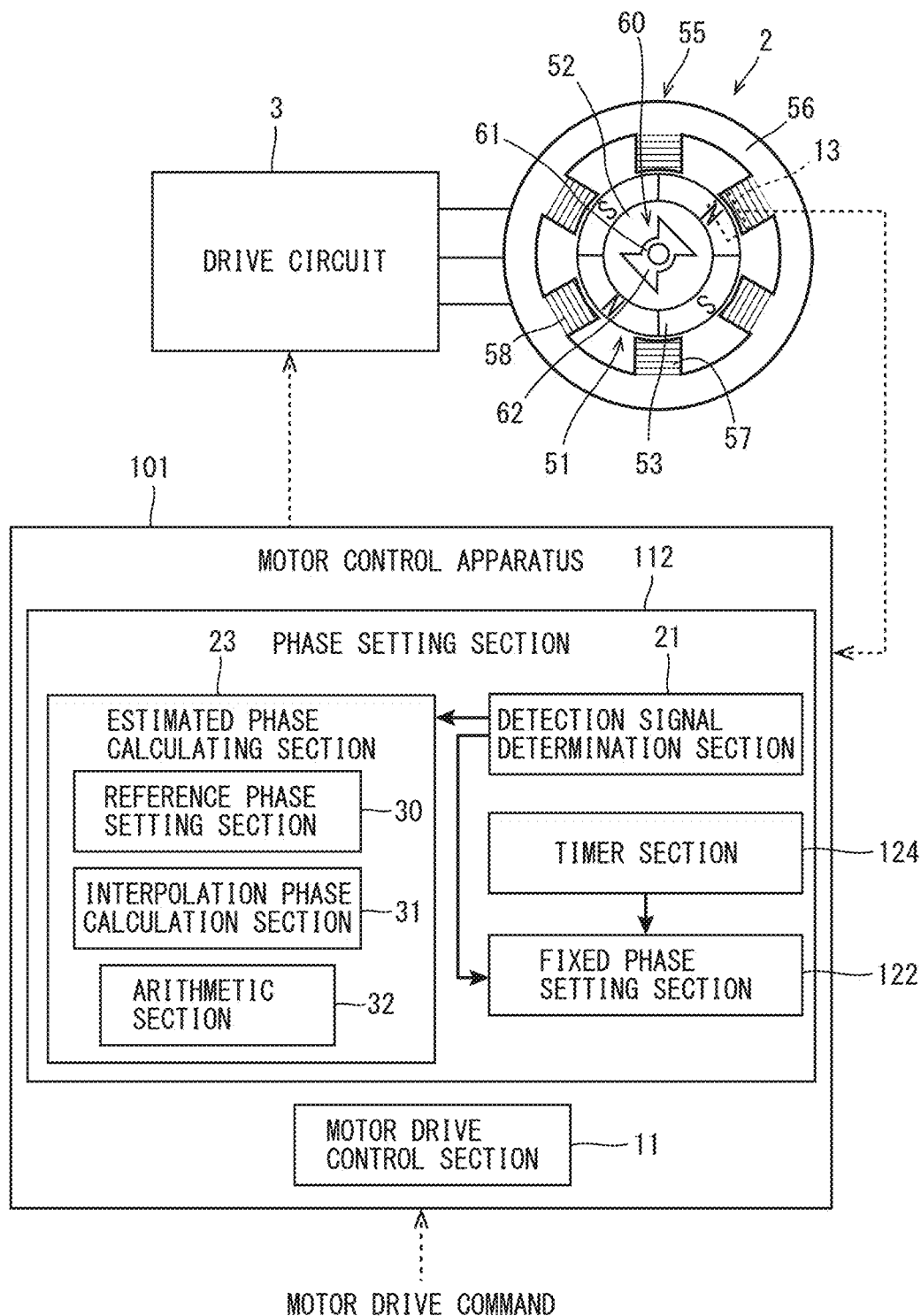
FIG. 7 is a view illustrating a schematic configuration of a motor control apparatus according to Embodiment 2, that corresponds to FIG. 1.

FIG. 7 is a view illustrating a schematic configuration of a motor control apparatus 101 according to Embodiment 2. The motor control apparatus 101 according to Embodiment 2 differs from the configuration of Embodiment 1 in the respect that, after the first fixed phase or second fixed phase is set, after a predetermined time period elapses and before edge detection, a third fixed phase or a fourth fixed phase is set as an auxiliary fixed phase. Hereunder, components that are the same as in the configuration of Embodiment 1 are assigned the same reference numerals as in Embodiment 1 and a description of such components is omitted, and only parts that differ from the configuration of Embodiment 1 are described.

Motor Control Apparatus

As illustrated in FIG. 7, the motor control apparatus 101 includes the motor drive control section 11 and a phase setting section 112. The phase setting section 112 includes the detection signal determination section 21, a fixed phase setting section 122, and a timer section 124.

Similarly to the fixed phase setting section 22 of Embodiment 1, during a period from the time of startup of the motor 2 until a calculation instruction signal is outputted by the detection signal determination section 21, the fixed phase setting section 122 sets a fixed phase in accordance with the detection signal that is outputted from the rotation position detecting section 13. Specifically, similarly to Embodiment 1, the fixed phase setting section 122 sets the first fixed phase and the second fixed phase. Note that, since setting of the first fixed phase and the second fixed phase is performed by similar operations to the operations of the fixed phase setting section 22 of Embodiment 1, a detailed description thereof is omitted here.

Further, after a predetermined time period elapses after setting the first fixed phase or the second fixed phase, the fixed phase setting section 122 sets a third fixed phase or a fourth fixed phase as an auxiliary fixed phase. Specifically, after setting the first fixed phase, when the timer section 124 that is described later detects that a predetermined time period has elapsed, the fixed phase setting section 122 sets the third fixed phase as an auxiliary fixed phase. Similarly, after setting the second fixed phase, when the timer section 124 that is described later detects that a predetermined time period has elapsed, the fixed phase setting section 122 sets the fourth fixed phase as an auxiliary fixed phase.

Note that, the aforementioned predetermined time period is shorter than an interval until an edge of the detection signal is detected. Further, the predetermined time period is determined for each motor according to the relation between errors in the phases and torque as illustrated in FIG. 3. The predetermined time period may be set in advance, or may be changed in accordance with a motor drive command that is inputted.

The third fixed phase is greater than 0 degrees and equal to or less than 90 degrees in terms of electrical angle relative to the first fixed phase. In the present embodiment, the third fixed phase is a value that is advanced by 60 degrees in terms of electrical angle relative to the first fixed phase. The fourth fixed phase is greater than 0 degrees and equal to or less than 90 degrees in terms of electrical angle relative to the second fixed phase. In the present embodiment, the fourth fixed phase is a value that is advanced by 60 degrees in terms of electrical angle relative to the second fixed phase.

Note that, in a case where an edge of the detection signal is detected by the detection signal determination section 21 after the first fixed phase is set, the fixed phase setting section 122 sets the second fixed phase without setting the third fixed phase. Further, in a case where an edge of the detection signal is detected by the detection signal determination section 21 after the second fixed phase is set, the fixed phase setting section 122 does not set the fourth fixed phase. In this case, the estimated phase calculating section 23 calculates an estimated phase according to a calculation instruction signal that is outputted from the detection signal determination section 21.

The timer section 124 measures a time period that passes from a time when the fixed phase setting section 122 sets the first fixed phase or the second fixed phase. If the aforementioned time period exceeds a predetermined time period, the timer section 124 outputs a fixed phase change signal.

In a case where the fixed phase change signal is inputted before an edge of the detection signal is detected by the detection signal determination section 21 (before the kind of the detection signal is switched), the fixed phase setting section 122 sets the third fixed phase or the fourth fixed phase. The motor drive control section 11 generates a control signal for driving the motor 2, using the fixed phase (first fixed phase, second fixed phase, third fixed phase or fourth fixed phase) that is set by the fixed phase setting section 122. Thereby, the motor 2 is subjected to drive control based on the fixed phase.

Operations of Motor Control Apparatus

Figure 8:
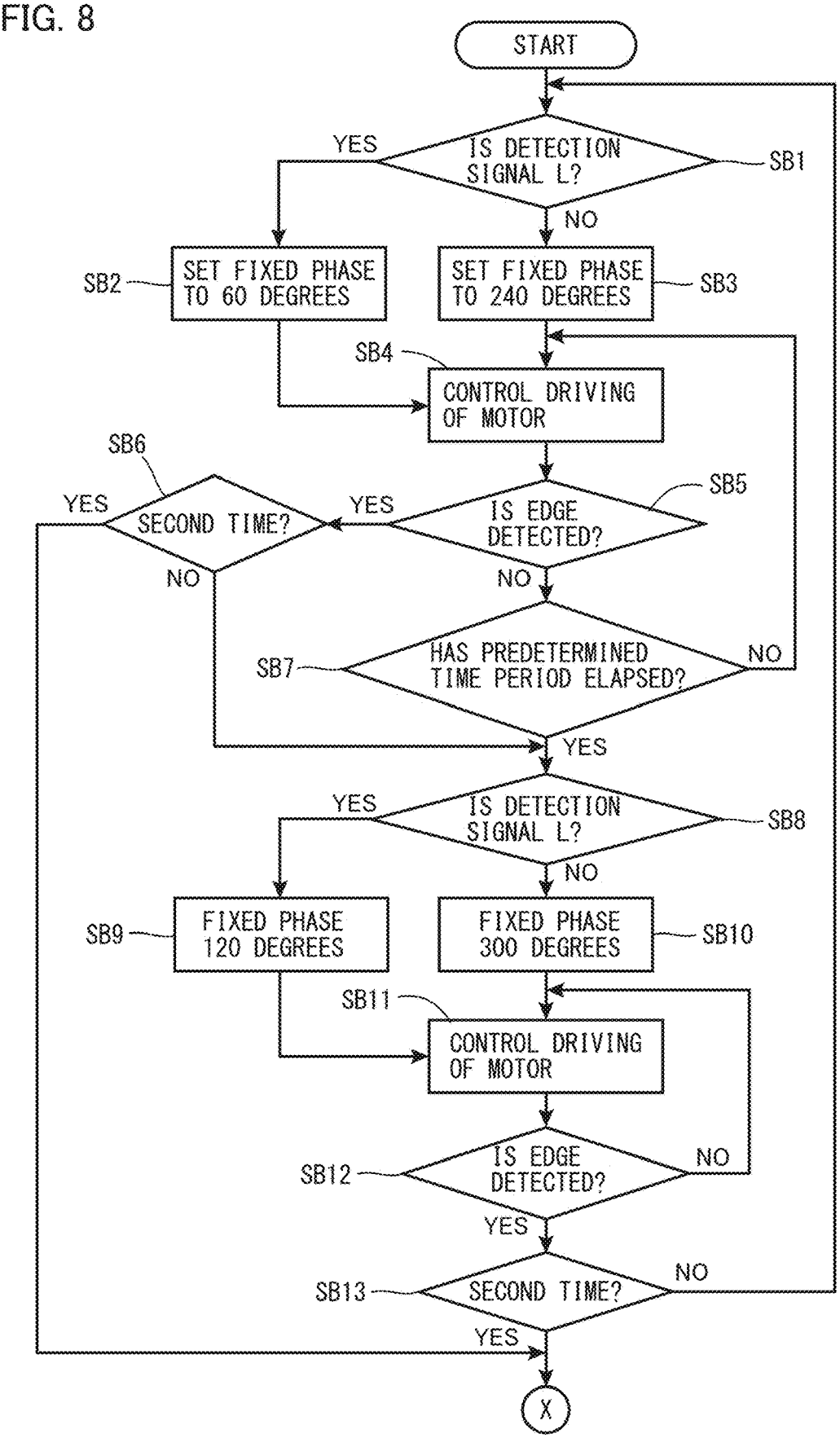
FIG. 8 is a flowchart illustrating an example of operations of a motor control apparatus.
Figure 9:
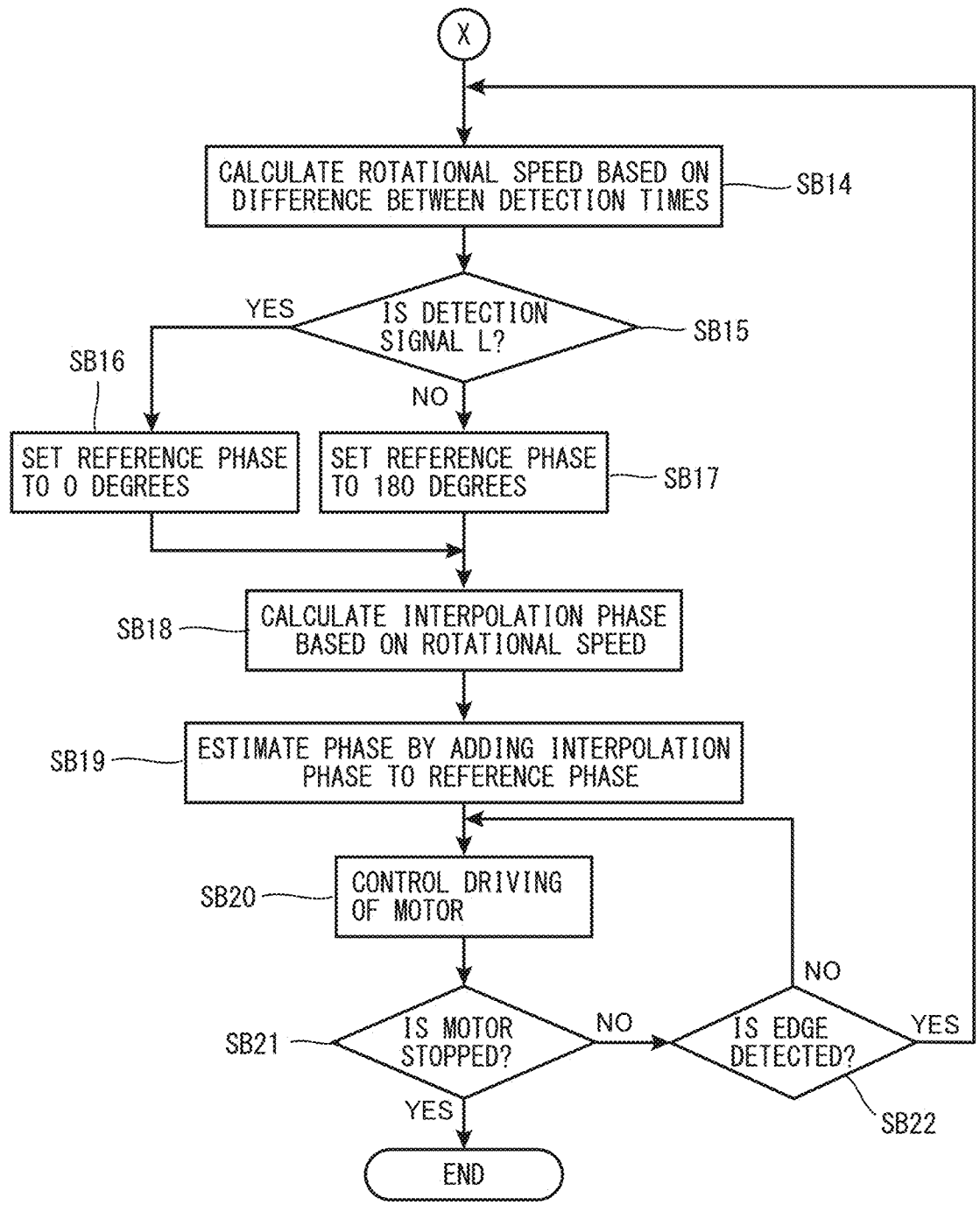
FIG. 9 is a flowchart illustrating an example of operations of a motor control apparatus.

Next, operations of the motor control apparatus 101 having the above described configuration are described using flowcharts illustrated in FIG. 8 and FIG. 9.

When the motor 2 starts, the operation flow in the flowchart illustrated in FIG. 8 starts (start). In the flowchart illustrated in FIG. 8, first, in step SB1, the fixed phase setting section 122 determines whether or not the detection signal that is outputted from the rotation position detecting section 13 is the Low signal.

If it is determined in step SB1 that the detection signal is the Low signal (Yes in SB1), the operation proceeds to step SB2 in which the fixed phase setting section 122 sets 60 degrees in terms of electrical angle as the first fixed phase. On the other hand, if it is determined in step SB1 that the detection signal is not the Low signal (No in SB1), that is, when the detection signal is the High signal, the operation proceeds to step SB3 in which the fixed phase setting section 122 sets 240 degrees in terms of electrical angle as the first fixed phase.

After the fixed phase setting section 122 sets the first fixed phase in step SB2 or step SB3, the operation proceeds to step SB4 in which the motor drive control section 11 generates a control signal for controlling driving of the motor 2 using the first fixed phase. Thereby, the motor 2 is subjected to drive control based on the first fixed phase, and the rotor 51 starts to rotate.

Thereafter, the operation proceeds to step SB5 in which the detection signal determination section 21 determines whether or not an edge of the detection signal that is outputted from the rotation position detecting section 13 is detected. If it is determined in step SB5 that an edge of the detection signal is detected (Yes in SB5), the operation proceeds to step SB6 in which it is determined whether or not the detection of the edge of the detection signal is the second time an edge has been detected.

In contrast, if it is determined in step SB5 that an edge of the detection signal is not detected (No in SB5), the operation proceeds to step SB7 in which it is determined whether or not a fixed phase change signal is outputted from the timer section 124, that is, whether or not a predetermined time period has elapsed since the time that the fixed phase setting section 122 sets the first fixed phase.

If it is determined in step SB6 that the detection of the edge of the detection signal is the second time an edge has been detected (Yes in SB6), the operation proceeds to step SB14, described later, in which the interpolation phase calculation section 31 calculates the rotational speed of the rotor 51.

In contrast, if it is determined in step SB6 that the detection of the edge of the detection signal is not the second time an edge has been detected (No in SB6), the operation proceeds to step SB8 in which the fixed phase setting section 122 determines whether or not the detection signal outputted from the rotation position detecting section 13 is the Low signal.

In step SB7, if it is determined that the predetermined time period has elapsed since the time that the fixed phase setting section 122 sets the first fixed phase (Yes in step SB7), the operation proceeds to the aforementioned step SB8.

In contrast, in step SB7, if it is determined that the predetermined time period has not elapsed since the time that the fixed phase setting section 122 sets the first fixed phase (No in step SB7), the operation returns to step SB4 in which drive control of the motor 2 based on the first fixed phase is continued.

In step SB8, if it is determined that the detection signal is the Low signal (Yes in step SB8), the operation proceeds to step SB9 in which the fixed phase setting section 122 sets 120 degrees in terms of electrical angle as the third fixed phase. On the other hand, if it is determined in step SB8 that the detection signal is not the Low signal (No in step SB8), that is, when the detection signal is the High signal, the operation proceeds to step SB10 in which the fixed phase setting section 122 sets 300 degrees in terms of electrical angle as the third fixed phase.

In step SB11 to which the operation proceeds after the fixed phase setting section 122 sets the third fixed phase in step SB9 or step SB10, the motor drive control section 11 generates a control signal for driving the motor 2, using the third fixed phase. Thus, the motor 2 is subjected to drive control based on the third fixed phase.

In step SB12 to which the operation proceeds after step SB11, the detection signal determination section 21 determines whether or not an edge of the detection signal is detected. If an edge of the detection signal is detected in step SB12 (Yes in step SB12), the operation proceeds to step SB13 in which the detection signal determination section 21 determines whether or not the detection of the edge of the detection signal is the second time an edge is detected. On the other hand, in step SB12, if an edge of the detection signal is not detected (No in SB12), the operation returns to step SB11 in which the motor 2 is subjected to drive control based on the third fixed phase.

If it is determined in step SB13 that the detection of the edge of the detection signal is the second time an edge has been detected (Yes in SB13), the operation proceeds to step SB14 in which the interpolation phase calculation section 31 calculates the rotational speed of the rotor 51.

In contrast, if it is determined in step SB13 that the detection of the edge of the detection signal is not the second time an edge has been detected (No in SB13), the operation returns to step SB1 in which a determination as to whether or not the detection signal is the Low signal is performed.

Note that, when the edge of the detection signal is detected in the aforementioned step SB12, the detection signal that is outputted from the rotation position detecting section 13 is switched from the High signal to the Low signal or from the Low signal to the High signal. Therefore, in a case where the detection signal is switched from the High signal to the Low signal in step SB1 (Yes in SB1) that is proceeded to when the result of the determination in step SB13 is "No", the fixed phase setting section 122 sets 60 degrees in terms of electrical angle as the second fixed phase (step SB2). On the other hand, in a case where the detection signal is switched from the Low signal to the High signal (No in SB1), the fixed phase setting section 122 sets 240 degrees in terms of electrical angle as the second fixed phase (step SB3). Thereafter, the motor drive control section 11 generates a control signal using the second fixed phase, and controls driving of the motor 2 (step SB4).

Next, in step SB5, the detection signal determination section 21 determines whether or not an edge of the detection signal is detected, and if it is determined that an edge of the detection signal is detected (Yes in step SB5), the operation proceeds to step SB6. In step SB6 it is determined whether or not the edge detection of the detection signal is the second time that an edge has been detected, and since in this case the edge detection of the detection signal is the second time, the operation proceeds to step SB14 and the subsequent steps.

In contrast, if it is determined in step SB5 that an edge of the detection signal is not detected (No in step SB5), the operation proceeds to step SB7 in which, similarly to the above description of step SB7, it is determined whether or not a predetermined time period has passed from the time that the second fixed phase is set. If it is determined in step SB7 that the predetermined time period has passed (Yes in step SB7), the operation proceeds to step SB8 in which the fixed phase setting section 122 determines whether or not the detection signal that is outputted from the rotation position detecting section 13 is the Low signal.

In step SB8, if it is determined that the detection signal is the Low signal (Yes in step SB8), the operation proceeds to step SB9 in which the fixed phase setting section 122 sets 120 degrees in terms of electrical angle as the fourth fixed phase. On the other hand, if it is determined in step SB8 that the detection signal is not the Low signal, that is, when it is determined that the detection signal is the High signal (No in step SB8), the operation proceeds to step SB10 in which the fixed phase setting section 122 sets 300 degrees in terms of electrical angle as the fourth fixed phase.

In step SB11 to which the operation proceeds after step SB9 or step SB10, the motor drive control section 11 generates a control signal using the fourth fixed phase, and controls driving of the motor 2.

In step SB12 to which the operation proceeds after step SB11, it is determined whether or not an edge of the detection signal is detected, and if it is determined that an edge of the detection signal is detected (Yes in SB12), the operation proceeds to step SB13. In step SB13, it is determined whether or not the edge detection of the detection signal is the second time that an edge has been detected, and since in this case the edge detection of the detection signal is the second time that an edge has been detected, the operation proceeds to step SB14 and the subsequent steps. On the other hand, in step SB12, if it is determined that an edge of the detection signal is not detected (No in SB12), the operation returns to step SB11, and drive control of the motor 2 based on the fourth fixed phase is continued until it is determined in step SB12 that an edge of the detection signal is detected.

The operations performed in and after step SB14 which the flow proceeds to when a second detection signal is outputted from the rotation position detecting section 13 in step SB14 are similar to the operations from steps SA7 to SA15 of Embodiment 1.

That is, in response to a calculation instruction signal that is outputted from the detection signal determination section 21, the interpolation phase calculation section 31 calculates the rotational speed of the rotor 51 (step SB14). Next, it is determined whether or not a detection signal that is outputted from the rotation position detecting section 13 is the Low signal (step SB15), and if the detection signal is the Low signal, the reference phase setting section 30 sets an electrical angle of 0 degrees as a reference phase (step SB16), while if the detection signal is the High signal, the reference phase setting section 30 sets an electrical angle of 180 degrees as a reference phase (step SB17).

Thereafter, an interpolation phase is calculated by integration of the rotational speed (step SB18), and the arithmetic section 32 determines an estimated phase by adding the interpolation phase to the reference phase (step SB19). The motor drive control section 11 generates a control signal that controls driving of the motor 2 using the estimated phase determined in step SB19 (step SB20). Thereby, the motor 2 is subjected to drive control based on the estimated phase determined in step SB19.

Thereafter, it is determined whether or not driving of the motor 2 stops (step SB21), and if driving of the motor 2 stops, the operation flow ends (end). On the other hand, if driving of the motor 2 is not stopped, a determination as to whether or not an edge of the detection signal is detected is performed (step SB22). If an edge of the detection signal is detected, the rotational speed is calculated based on the difference between the time of the most recent edge detection and the time of the edge detection that immediately preceded the most recent edge detection (step SB14). On the other hand, if an edge of the detection signal is not detected, drive control of the motor 2 based on the estimated phase is continued until driving of the motor 2 stops or an edge of the detection signal is detected (step SB20).

Here, steps SB1 to SB3 correspond to a first fixed phase setting step. Steps SB1 to SB3, and step SB12 and step SB13 correspond to a second fixed phase setting step. Steps SB11 to SB14, and step SB18 correspond to an interpolation phase calculation step. Steps SB15 to SB17, and step SB19 correspond to an estimated phase calculating step.

Further, steps SB7 to SB10 correspond to a third fixed phase setting step and a fourth fixed phase setting step.

Changes in Torque in Case Where Fixed Phase is Set

Next, changes in the torque generated at the rotor 51 in a case where the fixed phase is set by the fixed phase setting section 122 will be described. Hereunder, to simplify the description, a case is described in which the fixed phase setting section 122 sets the first fixed phase, and thereafter sets the third fixed phase after a predetermined time period elapsed. Changes in the torque generated at the rotor 51 in a case of an electrical angle of 60 degrees that is set when the detection signal is the Low signal, and in the case of an electrical angle of 240 degrees that is set when the detection signal is the High signal are similar. Therefore, hereunder a case in which the first fixed phase is set to 60 degrees in terms of electrical angle will be described.

As mentioned above, when the detection signal that is outputted from the rotation position detecting section 13 is the Low signal, rotation positions at which the rotor 51 stops are 30 degrees, 90 degrees and 150 degrees in terms of electrical angle. Hence, in a case where the fixed phase is set to 60 degrees in terms of electrical angle, an error between the fixed phase and the actual phase when the motor starts is −30 degrees, 30 degrees or 90 degrees in terms of electrical angle. Hereunder, changes in the torque accompanying rotation of the rotor 51 will be described for three patterns with respect to the rotation positions at which the rotor 51 stops (30 degrees, 90 degrees and 150 degrees in terms of electrical angle), respectively.

Pattern 1

Figure 10:
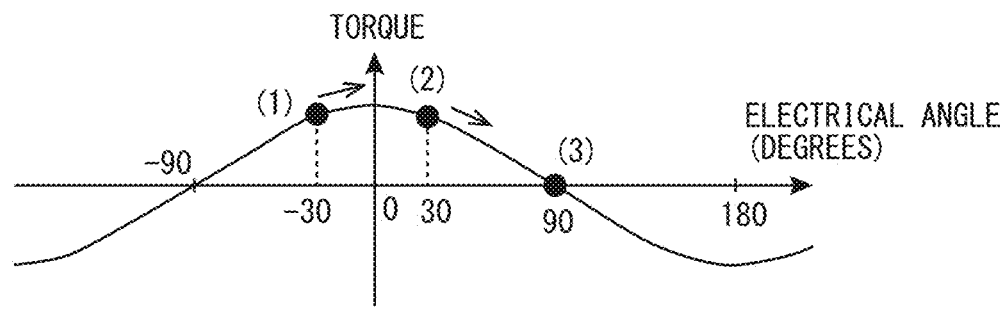
FIG. 10 is a view that schematically illustrates changes in torque generated at a rotor due to rotation of the rotor, in a case where a fixed phase is set.

A case where the rotor 51 stops at the rotation position of 30 degrees in terms of electrical angle is referred to as "pattern 1". In the case of pattern 1, an error between the fixed phase and the actual phase when the motor starts is −30 degrees. In FIG. 10 that shows changes in the torque with respect to the aforementioned error, the case of pattern 1 is denoted by reference numeral (1). In the case of pattern 1, a positive torque that causes forward rotation is generated at the rotor 51.

When the rotor 51 performs forward rotation, the actual phase gradually becomes larger, and consequently the error gradually decreases as indicated by a solid-line arrow in FIG. 10. Thus, the torque generated at the rotor 51 gradually increases.

Figure 11:
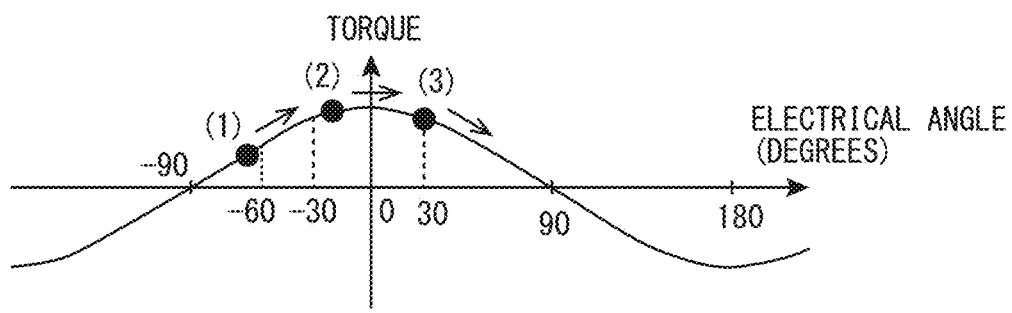
FIG. 11 is a view that schematically illustrates changes in torque generated at a rotor due to rotation of the rotor, in a case where the phase is changed to an auxiliary fixed phase.

After a predetermined time period elapses from a time that the fixed phase setting section 122 sets the first fixed phase, the fixed phase setting section 122 sets an electrical angle of 120 degrees as the third fixed phase. At this time, if the actual phase of the rotor 51 is taken as (30+α) degrees in terms of electrical angle, as indicated by reference numeral (1) in FIG. 11, an error between the actual phase and the third fixed phase is (−90+α) degrees in terms of electrical angle. Hence, because the absolute value of the error is less than 90 degrees in terms of electrical angle, a positive torque is generated at the rotor 51. Thus, the rotor 51 continues forward rotation.

When the error reaches 60 degrees in terms of electrical angle, the actual phase is 180 degrees in terms of electrical angle. Because the detection signal that is outputted from the rotation position detecting section 13 is switched to the High signal, an edge of the detection signal is detected by the detection signal determination section 21. Thereby, the fixed phase is switched to 240 degrees. Because the aforementioned error is within a range of greater than −90 degrees to less than 90 degrees in terms of electrical angle, the rotor 51 continues forward rotation.

Pattern 2

A case where the rotor 51 stops at the rotation position of 90 degrees in terms of electrical angle is referred to as "pattern 2". In the case of pattern 2, an error between the fixed phase and the actual phase when the motor starts is 30 degrees. In FIG. 10, the case of pattern 2 is denoted by reference numeral (2). In the case of pattern 2, a positive torque that causes forward rotation is generated at the rotor 51.

When the rotor 51 performs forward rotation, the actual phase gradually increases, and consequently, as indicated by a solid-line arrow in FIG. 10, the error gradually increases. Thus, the torque generated at the rotor 51 gradually decreases.

After a predetermined time period elapses from a time that the fixed phase setting section 122 sets the first fixed phase, the fixed phase setting section 122 sets an electrical angle of 120 degrees as the third fixed phase. At this time, if the actual phase of the rotor 51 is taken as (90+α) degrees in terms of electrical angle, as indicated by reference numeral (2) in FIG. 11, an error between the actual phase and the third fixed phase is (−30+α) degrees in terms of electrical angle. Hence, because the absolute value of the error is less than 90 degrees in terms of electrical angle, a positive torque is generated at the rotor 51. Thus, the rotor 51 continues forward rotation.

When the error reaches 60 degrees in terms of electrical angle, the actual phase is 180 degrees in terms of electrical angle, which is the same as in the case of pattern 1. Hence, a description thereof will be omitted here.

Accordingly, in the case of pattern 2 also, the rotor 51 continues forward rotation.

Pattern 3

A case where the rotor 51 stops at the rotation position of 150 degrees in terms of electrical angle is referred to as "pattern 3". In the case of pattern 3, an error between the fixed phase and the actual phase when the motor starts is 90 degrees. In FIG. 10, the case of pattern 3 is denoted by reference numeral (3). In the case of pattern 3, a torque is not generated at the rotor 51.

After a predetermined time period elapses from a time that the fixed phase setting section 122 sets the first fixed phase, the fixed phase setting section 122 sets an electrical angle of 120 degrees as the third fixed phase. At this time, as indicated by reference numeral (3) in FIG. 11, an error between the actual phase and the third fixed phase is 30 degrees in terms of electrical angle. Hence, because the absolute value of the error is less than 90 degrees in terms of electrical angle, a positive torque is generated at the rotor 51. Thus, the rotor 51 performs forward rotation.

When the error reaches 60 degrees in terms of electrical angle, the actual phase is 180 degrees in terms of electrical angle, which is the same as in the case of pattern 1. Hence, a description thereof will be omitted here.

Accordingly, in the case of pattern 3 also, the rotor 51 continues forward rotation.

As described above, at startup of the motor 2, by using a fixed phase for drive control of the motor 2, the motor 2 can be subjected to drive control easily and with good responsiveness in comparison to a prior method that performs an arithmetic operation to estimate the phase.

Furthermore, in the present embodiment, by using the first fixed phase and the third fixed phase, or the second fixed phase and the fourth fixed phase until an edge of the detection signal that is outputted from the rotation position detecting section 13 is detected, it is possible to generate a larger positive torque at the rotor 51 compared to a case of using only the first fixed phase or only the second fixed phase as in Embodiment 1. Hence, because the rotor 51 can be more reliably caused to perform forward rotation, the motor 2 can be started more quickly.

Other Embodiments

While embodiments of the present invention have been described above, the aforementioned embodiments are merely examples for implementing the present invention. Accordingly, the present invention is not limited to the above embodiments, and the aforementioned embodiments can be appropriately modified and implemented within a range that does not deviate from the gist of the present invention.

In the respective embodiments described above, the fixed phase setting section 22 sets the first fixed phase to 90 degrees in terms of electrical angle, and the fixed phase setting section 122 sets the first fixed phase to 60 degrees in terms of electrical angle. However, it suffices that, in a case where the detection signal that is outputted from the rotation position detecting section 13 is the Low signal, the first fixed phase is equal to or greater than −90 degrees in terms of electrical angle relative to the stable stopping point at the maximum electrical angle (in the present embodiments, 150 degrees) and is equal to or less than 90 degrees in terms of electrical angle relative to the stable stopping point at the minimum electrical angle (in the present embodiments, 30 degrees) among the stable stopping points of the rotor 51. Further, it suffices that, in a case where the detection signal that is outputted from the rotation position detecting section 13 is the High signal, the first fixed phase is equal to or greater than −90 degrees in terms of electrical angle relative to the stable stopping point at the maximum electrical angle (in the present embodiments, 330 degrees) and is equal to or less than 90 degrees in terms of electrical angle relative to the stable stopping point at the minimum electrical angle (in the present embodiments, 210 degrees) among the stable stopping points of the rotor 51.

In the respective embodiments described above, the fixed phase setting section 22 sets the first fixed phase to 90 degrees in terms of electrical angle, and sets the second fixed phase to 270 degrees in terms of electrical angle. Further, the fixed phase setting section 122 sets the first fixed phase to 60 degrees in terms of electrical angle, and sets the second fixed phase to 240 degrees in terms of electrical angle. That is, the fixed phase setting sections 22 and 122 set an electrical angle that is advanced by 180 degrees relative to the first fixed phase, as the second fixed phase.

However, it suffices that, when the kind of detection signal that is outputted from the rotation position detecting section 13 is switched due to rotation of the rotor 51, an electrical angle that is equal to or greater than −90 degrees in terms of electrical angle relative to the stable stopping point at the maximum electrical angle and is equal to or less than 90 degrees in terms of electrical angle relative to the stable stopping point at the minimum electrical angle among the stable stopping points of the rotor 51 is set as the second fixed phase in accordance with the detection signal after the kind of detection signal is switched.

That is, it suffices that, in a case where the detection signal after switching is the Low signal, the second fixed phase is equal to or greater than −90 degrees in terms of electrical angle relative to the stable stopping point at the maximum electrical angle (in the present embodiments, 150 degrees) and is equal to or less than 90 degrees in terms of electrical angle relative to the stable stopping point at the minimum electrical angle (in the present embodiments, 30 degrees) among the stable stopping points of the rotor 51. Further, it suffices that, in a case where the detection signal after switching is the High signal, the second fixed phase is equal to or greater than −90 degrees in terms of electrical angle relative to the stable stopping point at the maximum electrical angle (in the present embodiments, 330 degrees) and is equal to or less than 90 degrees in terms of electrical angle relative to the stable stopping point at the minimum electrical angle (in the present embodiments, 210 degrees) among the stable stopping points of the rotor 51.

In the respective embodiments described above, the stable stopping points are 30 degrees, 90 degrees and 150 degrees within a range of electrical angles from 0 degrees to 180 degrees, and are 210 degrees, 270 degrees and 330 degrees within a range of electrical angles from 180 degrees to 360 degrees. However, in the case of using a motor having a different structure to the aforementioned embodiments, the electrical angles of the stable stopping points are different from the examples in the aforementioned embodiments. The configurations of the aforementioned embodiments are also applicable to such a case. Note that, even in such a case, within a range of electrical angles from 0 degrees to 180 degrees and a range of electrical angles from 180 degrees to 360 degrees, respectively, the stable stopping point at which the electrical angle is smallest is the stable stopping point at the minimum electrical angle, and the stable stopping point at which the electrical angle is largest is the stable stopping point at the maximum electrical angle.

In Embodiment 2 that is described above, the fixed phase setting section 122 sets the first fixed phase or the second fixed phase in accordance with detection of an edge of the detection signal outputted from the rotation position detecting section 13, and also sets the third fixed phase or the fourth fixed phase as an auxiliary fixed phase after a predetermined time period elapses from the time that the first fixed phase or the second fixed phase is set. However, the fixed phase setting section may set a plurality of the auxiliary fixed phases in a period until an edge of the detection signal is detected. For example, the fixed phase setting section may set an auxiliary fixed phase after a first predetermined time period elapses after setting the first fixed phase, and furthermore, after setting the aforementioned auxiliary fixed phase, may set a different auxiliary fixed phase after a second predetermined time period elapses. However, in this case also, the fixed phase setting section sets the second fixed phase when the edge of the detection signal is detected.

In Embodiment 2 that is described above, the third fixed phase and the fourth fixed phase are values that are advanced by 60 degrees in terms of electrical angle relative to the first fixed phase and the second fixed phase, respectively. However, the third fixed phase and the fourth fixed phase may be any value as long as each value is greater than 0 degrees and equal to or less than 90 degrees in terms of electrical angle relative to the first fixed phase and the second fixed phase, respectively.

INDUSTRIAL APPLICABILITY

The present invention can be utilized for a motor control apparatus that, when rotation of a motor starts, controls driving of the motor using a detection signal that is outputted at every 180 degrees in terms of electrical angle in accordance with rotation of a rotor.

The invention claimed is:

1. A motor control apparatus that controls driving of a motor, comprising:
   a rotation position detecting section that, at every 180 degrees of an electrical angle of the motor, outputs two kinds of detection signals according to a rotation position of a rotor of the motor;
   a fixed phase setting section that sets a fixed phase of the motor according to the detection signal;
   an estimated phase calculating section that calculates an estimated phase using the detection signal and the fixed phase; and
   a motor drive control section that controls rotation of the rotor based on the fixed phase or the estimated phase; wherein:
   the fixed phase setting section:
   at a start of rotation of the rotor, in accordance with the detection signal, sets as the fixed phase a first fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor, and
   upon the kind of the detection signal that is outputted from the rotation position detecting section switching due to rotation of the rotor, in accordance with the detection signal after switching, sets as the fixed phase a second fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor;
   and the estimated phase calculating section comprises:
   an interpolation phase calculation section that, upon the kind of the detection signal that is outputted from the rotation position detecting section switching again due to rotation of the rotor, calculates an interpolation phase using a time at which the kind of the detection signal first is switched and a time at which the kind of the detection signal is switched for a second time, and
   an arithmetic section that calculates the estimated phase by adding the interpolation phase to a reference phase that is determined according to the detection signal after the kind of the detection signal is switched for the second time.

2. The motor control apparatus according to claim 1, wherein:
   upon a predetermined time period elapsing from a time when the first fixed phase or the second fixed phase is set as the fixed phase, and before the kind of the detection signal that is outputted from the rotation position detecting section is switched due to rotation of the rotor, the fixed phase setting section sets as the fixed phase an auxiliary fixed phase that, relative to the fixed phase that is set, is greater than 0 degrees and is equal to or less than 90 degrees in terms of electrical angle.

3. A method for controlling a motor, comprising:
a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor;
a second fixed phase setting step of controlling driving of the motor by means of a motor drive control section using the first fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor;
an interpolation phase calculation step of controlling driving of the motor by means of the motor drive control section using the second fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and
an estimated phase calculating step of calculating an estimated phase by adding the interpolation phase to a reference phase that is determined according to the detection signal after the kind of the detection signal is switched for the second time.

4. A method for controlling a motor, comprising:
a first fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a first fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor;
a third fixed phase setting step of controlling driving of the motor by means of a motor drive control section using the first fixed phase, and upon a predetermined time period elapsing from a time that the first fixed phase is set, and before the kind of the detection signal that is outputted from the rotation position detecting section is switched due to rotation of the rotor, setting as a third fixed phase an electrical angle that is greater than 0 degrees and is equal to or less than 90 degrees relative to the first fixed phase;
a second fixed phase setting step of controlling driving of the motor by means of the motor drive control section using the third fixed phase, and upon the kind of the detection signal that is outputted from the rotation position detecting section switching due to rotation of the rotor, in accordance with the detection signal after switching, setting as a second fixed phase an electrical angle that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor;
a fourth fixed phase setting step of controlling driving of the motor by means of a motor drive control section using the second fixed phase, and upon a predetermined time period elapsing from a time that the second fixed phase is set, and before the kind of the detection signal that is outputted from the rotation position detecting section is switched due to rotation of the rotor, setting as a fourth fixed phase an electrical angle that is greater than 0 degrees and is equal to or less than 90 degrees relative to the second fixed phase;
an interpolation phase calculation step of controlling driving of the motor by means of the motor drive control section using the fourth fixed phase, and upon the kind of the detection signal that is outputted from the rotation position detecting section switching again due to rotation of the rotor, calculating an interpolation phase using a time at which the detection signal first is switched and a time at which the detection signal is switched for a second time; and
an estimated phase calculating step of calculating an estimated phase by adding the interpolation phase to a reference phase that is determined according to the detection signal after the kind of the detection signal is switched for the second time.

* * * * *